3,475,133
APPARATUS FOR CARRYING OUT A METHOD OF PURIFICATION FOR FLUE GASES
Heinz Müller-Wartenberg, Frankfurt am Main, Germany, assignor to Metallgesellschaft Aktiengesellschaft, Frankfurt am Main, Germany
Filed Dec. 30, 1965, Ser. No. 517,602
Claims priority, application Germany, Jan. 2, 1965, M 63,679
Int. Cl. B01t 1/22, 1/14
U.S. Cl. 23—288                        9 Claims

ABSTRACT OF THE DISCLOSURE

Scrubber for removing $SO_2$ from flue gases comprising a plurality of spaced overlying beds in which the gas is contacted with scrubbing liquid sprayed into each bed and collected as it leaves the bed. Gas flows in parallel through the beds, entering between the beds from one side and leaving the beds from the other side. Baffling is provided so that the flow through the beds is concurrent.

---

In, for instance, the purification of the flue gases of oil or coal-fired boilers, the removal of sulfur-containing components contained in said gases, in addition to the removal of the dust, is of great interest in practical operation. The sulfur-containing impurities of the flue gases consist predominantly of sulfur dioxide. Very extensive methods are known by means of which sulfur compounds, and particularly sulfur dioxide, can be removed from flue gases. In addition to scrubbing out the sulfur compounds by the use, for instance, of ammonium-containing scrubbing liquids, two other methods have acquired practical importance. Both methods are characterized by the fact that coke or activated carbon, and therefore carbonaceous material is used as catalyst or as adsorber or absorber. In the one method, one operates in the dry at elevated temperatures, while the other method is employed wet at normal temperature or a slightly elevated temperature. The latter method is of particular interest within the scope of the present invention. The flue gases containing sulfur dioxide are conducted for instance in this method through layers of coke acting as catalyst, the said layers being continuously and/or periodically sprayed or flushed with water or sulfuric acid. The sulfur dioxide is oxidized to sulfur trioxide, as a result of the catalytic action of the carbon with the presence of atmospheric oxygen, and the sulfur trioxide reacts with water to form sulfuric acid.

The layers of coke are preferably arranged in superimposed beds, the gases flowing through said beds with repeated change in the direction of the gas, but in overall upward direction, while the sulfuric acid is discharged below the layers of coke by means of drainage trays and gutters.

Since the gases which contain the sulfur compounds are also charged to a greater or lesser extent with dust, and in addition to this, are at high temperatures, they cannot be fed directly to the catalyst beds. Prior cooling and/or scrubbing is necessary, as well as, possibly, at least in the case of coal-fired boilers, a mechanical or electrical removal of dust. Up to now, the hot dust-laden sulfur-dioxide-containing gases have been cooled in, for instance, an evaporation-type cooler, freed of entrained dust in an electrostatic dust precipitator, and then fed to a reaction vessel for the removal of the sulfur compounds.

It is clear that this requires tremendous amounts of equipment and space. The space alone which is required for such a purification system confronts the industry with problems which are frequently unsurmountable. This is always true when such systems are to be installed subsequently in existing plants. Even in the case of new plants, it is again and again found that sufficient ground and space for such systems is not available.

This is where the invention comes into play. The object and purpose of the invention is to eliminate these difficulties and considerably to reduce the extremely high investment costs and the large amount of equipment required.

The present invention proposes an apparatus for the carrying out of a multi-stage method of purifying flue gases which contain sulfur compounds, and particularly the flue gases of oil or coal-fired boilers, the gases being subjected to a wet catalysis with preferred use of coal or carbon as catalyst in order to remove the sulfur-containing components and particularly sulfur dioxide, after the gases have been previously treated in coolers and scrubbers and had the dust removed from them possibly in mechanical or electrical dust precipitators, the cooler and/or scrubber, and, if employed, the dust precipitator being arranged vertically one above the other with catalyst reaction beds in a tower-like common housing of preferably prefabricated plates forming a closed structural part which is developed as a gas shaft.

The further development of the invention involves inventive developments of the gas shaft which in accordance with the invention is divided up vertically into a plurality of flues by a plurality of superimposed catalysis reaction beds and run-off trays which form barrier walls, the catalysis reaction beds desirably being staggered vertically with respect to each other in a staircase-like manner so that, seen in the direction of the gas, they are shifted with increasing length into the oncoming flow of the gas shaft in vertically upward direction. The lateral offset provides an upwardly decreasing flow area on the inlet side of the beds and an upwardly increasing cross-sectional flow area on the outlet side of the beds.

The lower part of the common housing which is developed as gas shaft can, in accordance with the invention, comprise an acid or fluid collecting container.

Another feature of the invention is that the scrubbers and/or coolers and/or mechanical or electrical dust precipitators arranged below the catalyst reaction beds have their walls or surrounding surfaces used to form the wall of the common housing which acts as gas shaft.

In accordance with the invention, the common housing, as well as parts of the inner equipment of the plant, for instance stairs, platforms, gas deflecting members, trays and the like are made of prefabricated parts. Prefabricated plates having a base of concrete and plastic can preferably be used for this purpose. In addition to reducing the cost of material, this has the further technological advantage that for instance concrete plates can be produced or cast at the plate of erection. These prefabricated plates can also, for the present special case, be connected with each other by bonding in the traditionally customary manner. It is furthermore possible to connect and fasten the inner equipment, for instance for electrostatic dust precipitators to the concrete or plastic plates by bonding. The same is true of the cooler and scrubber that are to be used. Due to the susceptibility of concrete to corrosion, all structural parts which come into contact with acid must be provided with plastic coatings, coatings of ceramic material or other corrosion resistant coatings.

The invention will now be explained in further detail with reference to embodiments given by way of example, in the accompanying drawings, in which.

The showing of FIGS. 1 to 10 is purely schematic and is not to scale. In the various figures, like reference characters refer to corresponding parts.

For cooler and scrubber, there is used, in order to facilitate understanding, the symbol for a stylized shower in an empty field; for the dust precipitator, there has been chosen a zig-zag arrow which symbolizes electricity in the traversed field in the case of electric dust precipitators and preferably electrostatic dust precipitators, and the schematic showing of a cyclone as symbol for any type of mechanical dust precipitator, such as cyclone, bag, fabric or granulate filter and the like.

Figure 1:
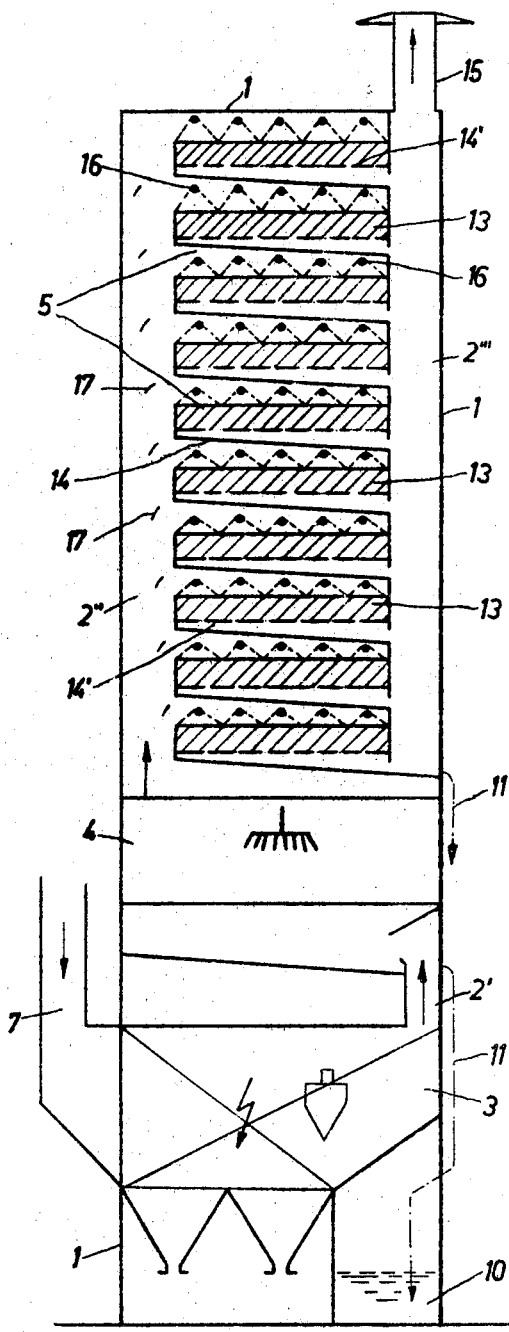
FIG. 1 shows the apparatus in accordance with the invention including three purifying zones: dust precipitator, cooler and scrubber, and a separator for sulfur-containing components of the flue gas, preferably a sulfur dioxide separator, all being combined into a single unit.
Figure 2:
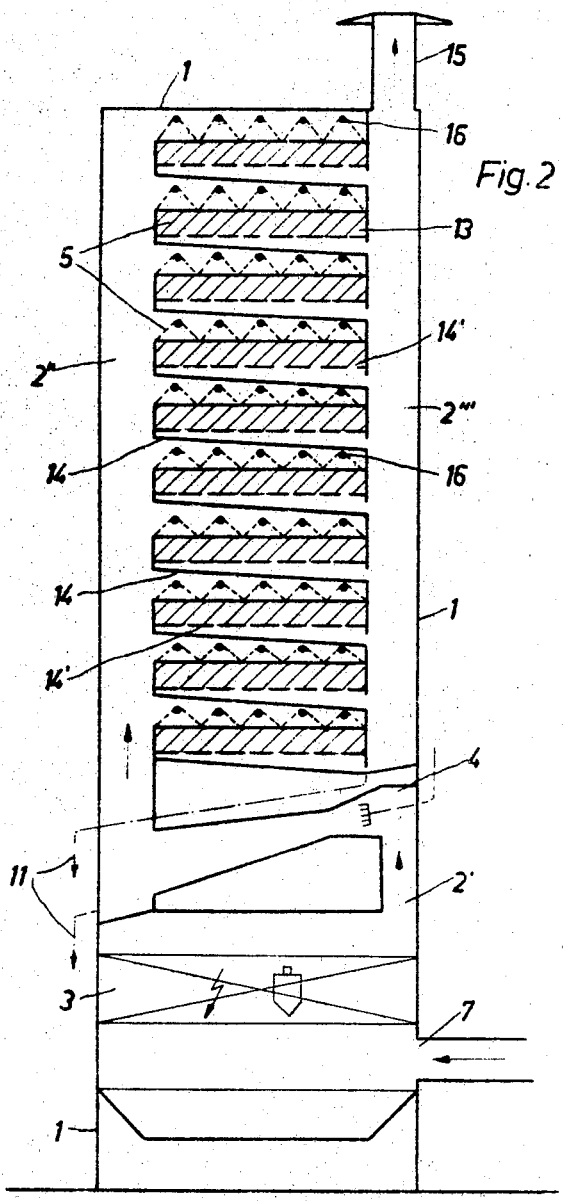
FIG. 2 shows apparatus similar to that of FIG. 1, but with a special cooler and scrubber, namely, a Venturi scrubber instead of the common scrubber of FIG. 1.

The apparatus shown in FIGS. 1 and 2 are used essentially only in the case of coal-fired boilers. The apparatus of FIG. 3, due to the optional raw gas feed line, can be used both for coal-fired boilers—with dust pecipitator—and for oil-fired boilers—without dust precipitator—or for the treatment of any desired off-gases which contain sulfur compounds.

Figure 4:
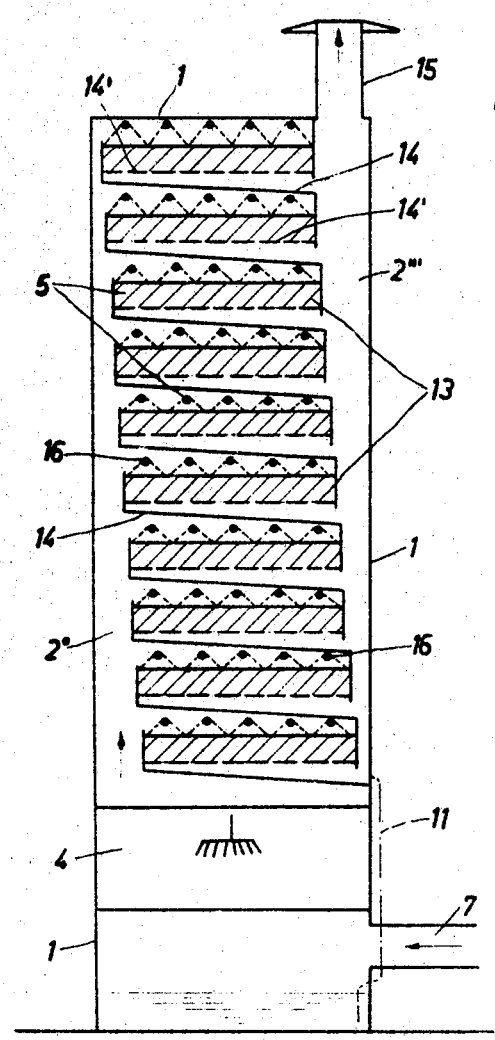
FIG. 4 shows apparatus in accordance with the invention for oil-fired boilers, an ordinary scrubber being merely provided upstream of the sulfur dioxide separator.
Figure 5:
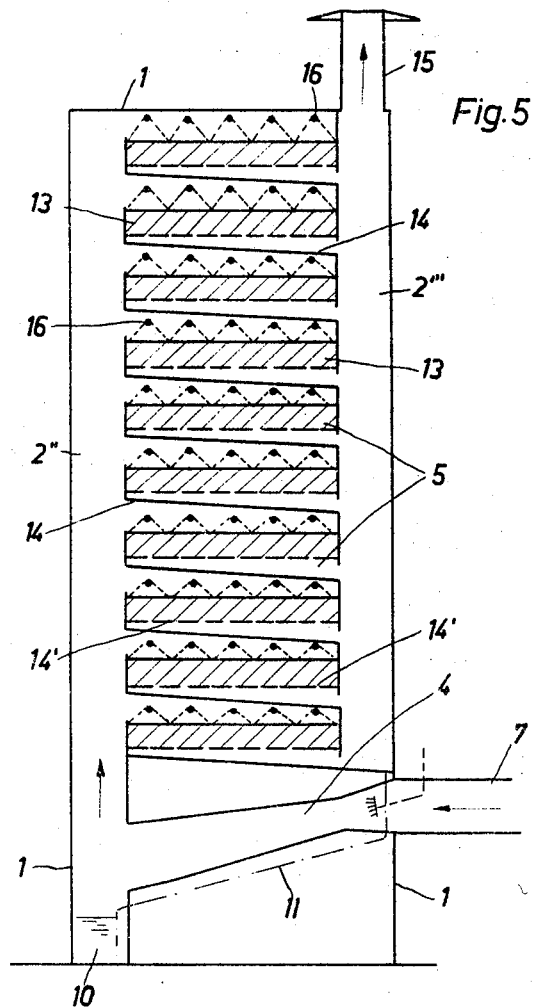
FIG. 5 shows the same apparatus as FIG. 4, with the use of a Venturi tube as cooler and scrubber.

The apparatus of FIGS. 4 and 5 can be used also for coal-fired boilers when the amount of dust present is such that a single gas scrubbing is sufficient to remove the dust.

Figure 3:
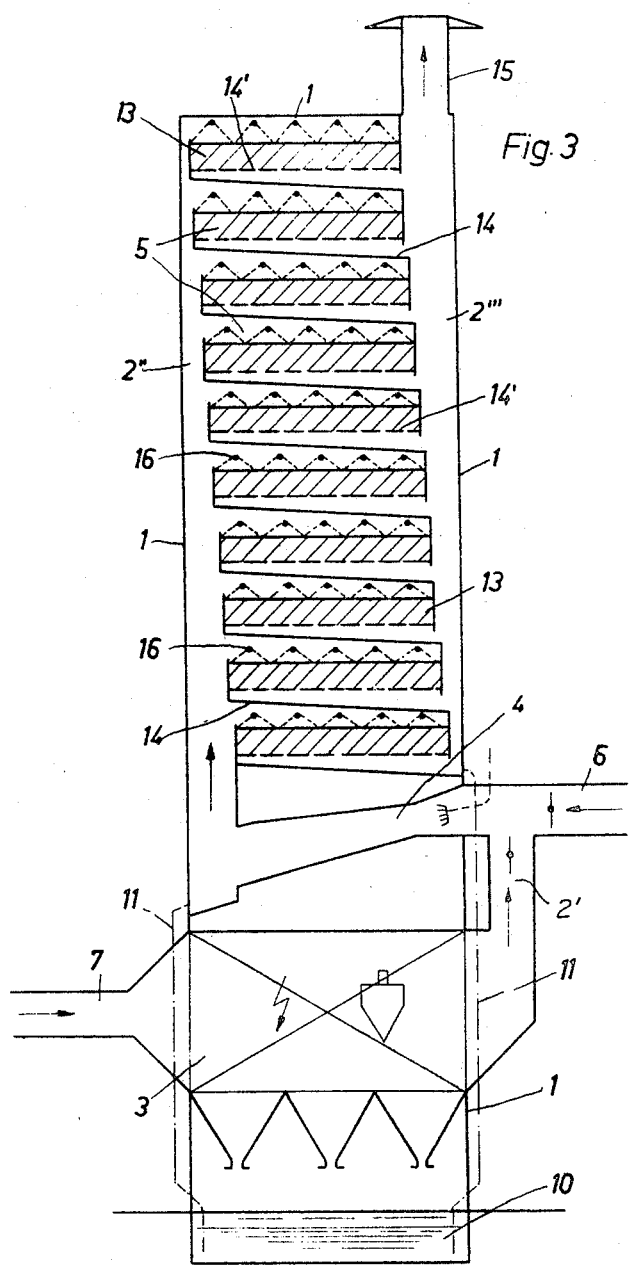
FIG. 3 shows the same apparatus as in FIG. 2, but with optional feeding of the raw gas to the dust precipitator.
Figure 6:
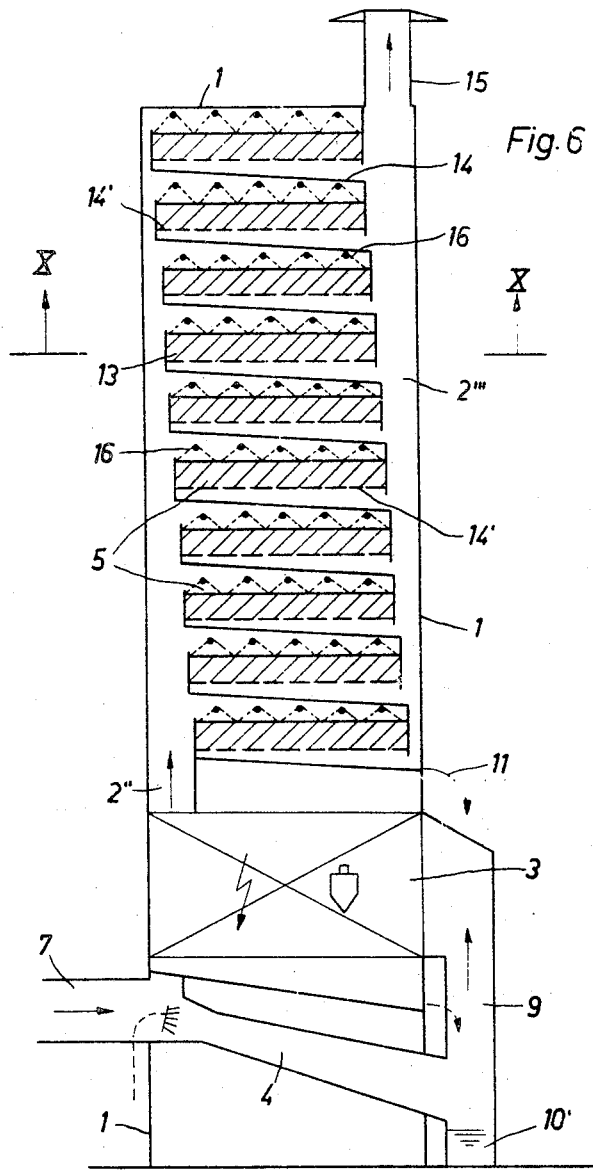
FIG. 6 shows the apparatus similar to FIG. 2 in which the order of the coolers or scrubbers is changed with respect to a dust precipitator.
Figure 7:
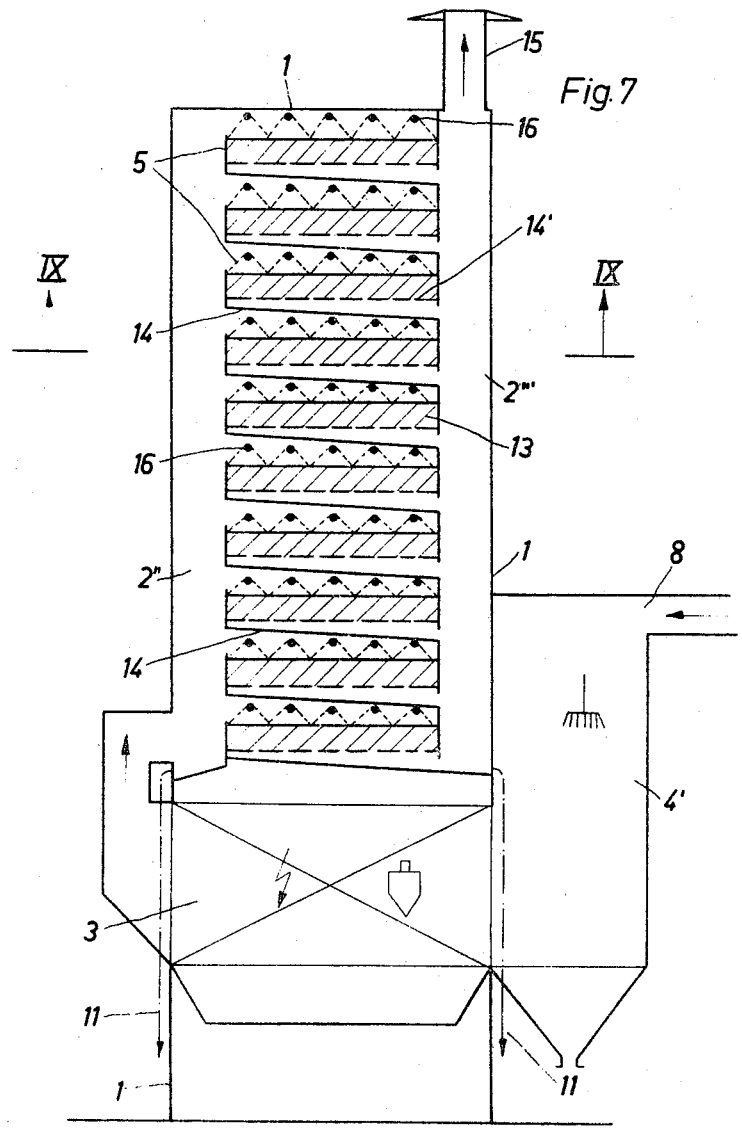
FIG. 7 and FIG. 8 show the arrangement of a scrubber and cooler alongside the common housing, the gas shaft and evaporation-type cooler having a common wall in the case of the arrangement shown in FIG. 7.
Figure 8:
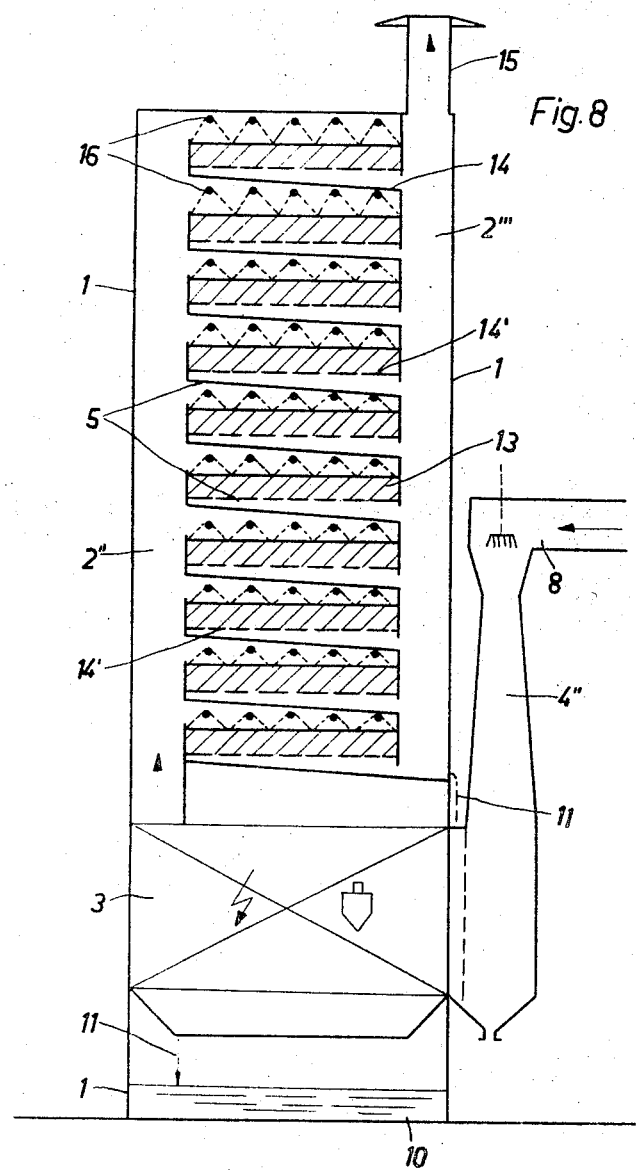

In a housing 1, in FIGS. 1, 2, and 3, there is arranged above a dust precipitator 3, a cooler and scrubber 4. In FIG. 2 and in FIG. 3, a Venturi scrubber is used. Above the scrubber is the gas shaft comprising sulfur dioxide separator 5. The reactor, which in the present example is refered to as a sulfur dioxide separator, can of course also be used to separate any desired sulfur-containing compounds from flue gases. The apparatus in accordance with FIG. 3 has an additional raw gas inlet 6 so that the dust precipitator 3 in this arrangement can be optionally connected or disconnected. The apparatus shown in FIG. 3 can be used for the purification of gases of both oil-fired and coal-fired boilers, or for the purification of any desired off-gases which contain sulfur compounds. Flues or conduits 2', 2", and 2''' are provided; 2' is the flue of the gas shaft which—cf. FIGS. 1 and 3—connects the mechanical or electrical dust precipitator 3 with the coolers and scrubbers 4. The flue 2', therefore, represents the gas connecting conduit between dust precipitator and cooler. After leaving the cooler or scrubber 4 (which can be a Venturi, hurdle, bubble tray, or packed body scrubber), the gas flows in the devices in accordance with FIGS. 1 to 5 through the inlet flue 2" into the sulfur dioxide separator 5 which it leaves through the discharge flue 2'''. In case of the devices of FIGS. 6 to 8, the same is true in a figurative sense, but the sequence of the dust precipitator and cooler or scrubber is reversed. In FIGS. 1 to 7, 7 is the raw gas inlet into the combined gas purifier. In FIGS. 7 and 8, 8 is the raw gas inlet into the system, i.e., the raw gas inlet into the evaporation-type cooler 4' or Venturi scrubber 4" arranged upstream of the dust remover, which in turn is upstream of the catalyst beds. In FIG. 6, dust precipitator 3 and cooler or scrubber 4 also have their order interchanged. In addition to this, the gas connecting channel 9 of the two lies outside the housing 1.

Figure 9:
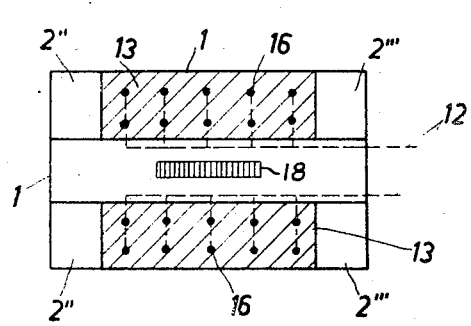
FIG. 9 is a cross-section through the sulfur dioxide separator of FIGS. 1, 2, 5, 7, and 8, approximately along the section line IX—IX of FIG. 7.
Figure 10:
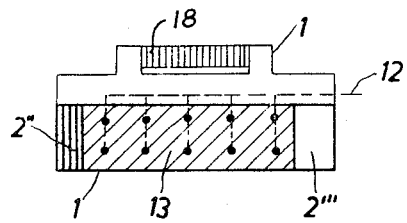
FIG. 10 is a section through the sulfur dioxide separator according to FIGS. 3, 4, and 6, aproximately along the section line X—X of FIG. 6.

In FIGS. 4 and 5, there is no mechanical or electrical dust precipitator. These devices are suitable for use preferably for oil-fired boilers with only little dust. 10 is the liquid or acid collecting container which is arranged in the common housing in the devices according to FIGS. 1, 3, 4, 5, and 8. In FIG. 5, the inlet flue 2" is extended down to the bottom and its lower end is developed as liquid collecting container 10. In FIG. 6, the lower part of the gas connecting conduit 9 is developed as liquid collecting container 10'. In all figures, with the exception of FIGS. 9 and 10, 11 signifies the acid or liquid outlets which discharge the acid in part into the acid collecting containers 10, 10' and in part outside of the housing 1. In FIGS. 7 and 8, there are shown devices in which the coolers 4' and 4" are arranged vertically outside the housing 1. In the cases in which the gas shaft and laterally arranged cooler and/or scrubber—cf. FIG. 7—have a common wall, expansion pieces and/or thermal insulations are provided in the section of the wall in order to overcome the forces caused by the temperature gradient. In FIGS. 9 and 10, cross-sections are shown. Two tiers of beds are shown in FIG. 9 while a single tier is shown in FIG. 10. A servicing stairway 18 is provided. The reference number 12 is used for the water or acid feed lines by means of which the catalysis reaction beds 13 are continuously or periodically sprayed. The catalysis reaction beds 13 are arranged in the part of the joint housing which is termed the sulfur dioxide separator 5. They are arranged one above the other and connected with each other by obliquely extending run-off trays 14 in such a manner that in each case one run-off tray is connected with the one upper side edge of a catalysis reaction bed container—which are preferably rectangular—and with the opposite lower side edge of the immediately superior container. In this way, provision is made for parallel flow through the beds with the run-off trays 14 serving as baffles for directing the gas from passageway 2" to the catalyst beds. The vertically upward rising gas which is to be treated is forced after changing direction twice by 90° to flow vertically downward through the catalysis reaction beds 13. After two further changes in direction of 90° each, the pure gas leaves the treatment apparatus through flue 2''' of the gas shaft and the stack 15. The catalysis reaction beds 13 consist preferably of beds of coke which are piled on perforated trays 14' and sprayed continuously or periodically with water and/or sulfuric acid by means of nozzles 16. It also lies within the scope of the invention to use instead of carbon (preferably coke) other catalysts which are suitable for a wet catalytic conversion of, for instance, sulfuric dioxide into sulfuric acid. For example, porous plastic granulate is employed in practice. For the uniform distribution of the gas over the individual catalyst reaction beds 13, deflection vanes 17 are provided in the inlet flue 2", as shown for instance in FIG. 1. In accordance with the invention, the distribution of the gas in the flues 2" and 2"' can be controlled surprisingly satisfactorily by arranging the catalysis reaction beds 13 so that they are offset laterally as shown in FIGS. 3 and 4 to provide a decreasing cross-sectional area in flue 2" and the opposite in flue 2"'. This can be noted also in FIGS. 6 and 10. The path of the gas is indicated by the full line arrows, and the path of the effluent scrubbing liquor is indicated by broken line arrows.

What is claimed is:

1. Apparatus for removal of sulfur compounds from flue gases which comprises:
  (a) a gas shaft having a plurality of catalyst beds disposed at vertically spaced intervals, and means separating the beds for parallel flow of flue gas through the beds,
  (b) means for spraying the top of each of the beds with an aqueous medium,
  (c) said catalyst beds being spaced from two opposite sides of said housing providing a first passageway between the beds and the housing for passage of gas to the catalyst beds and a second passageway between the beds and the housing for receiving gas from the beds; a gas outlet stack communicating with the upper end of said second passageway, a baffle interposed between each catalyst bed and the next lower catalyst bed joined to the end of the upper bed adjacent said first passageway and joined to the end of the lower bed adjacent said second passageway for conveying gas from the first passageway to the top of the lower bed and for receiving aqueous medium sprayed onto the upper bed and conveying the aqueous medium after issuance from the upper bed to adjacent said second passageway, whereby flow of gas and liquor through the beds is concurrent,
  (d) a scrubber for scrubbing and cooling the gas by contacting the gas with an aqueous medium, said scrubber being disposed beneath the gas shaft,
  (e) conduit means interconnecting the scrubber and the gas shaft for transfer of flue gas to the gas shaft after passage of the flue gas through the aqueous medium, and
  (f) a common housing for the gas shaft and scrubber.

2. Apparatus according to claim 1, said beds being laterally offset providing an upwardly decreasing flow area on the inlet side of the beds and an upwardly increasing cross-sectional flow area on the outside of the beds.

3. Apparatus according to claim 1, where a fluid collecting chamber is disposed in the lower part of the housing.

4. Apparatus according to claim 1, and a dust remover disposed in the housing upstream of the gas shaft.

5. Apparatus according to claim 1, said catalyst beds being rectangular in horizontal cross-section.

6. Apparatus for removal of sulfur compounds from flue gases which comprises:
  (a) a gas shaft having a plurality of catalyst beds disposed at vertically spaced intervals, and means separating the beds for parallel flow of flue gas through the beds,
  (b) means for spraying the top of each of the beds with an aqueous medium,
  (c) said catalyst beds being spaced from two opposite sides of said housing providing a first passageway between the beds and the housing for pasage of gas to the catalyst beds and a second passageway between the beds and the housing for receiving gas from the beds; a gas outlet stack communicating with the upper end of said second passageway, a baffle interposed between each catalyst bed and the next lower catalyst bed joined to the end of the upper bed adjacent said first passageway and joined to the end of the lower bed adjacent said second passageway for conveying gas from the first passageway to the top of the lower bed and for receiving aqueous medium sprayed onto the upper bed and conveying the aqueous medium after issuance from the upper bed to adjacent said second passageway, whereby flow of gas and liquor through the beds is concurrent,
  (d) a dust remover disposed beneath the gas shaft,
  (e) conduit means interconnecting the dust remover and the gas shaft for transfer of flue gas to the gas shaft after passage of the flue gas through the dust remover,
  (f) a common housing for the gas shaft and dust remover, and
  (g) a scrubber for scrubbing and cooling the gas by contacting the gas with an aqueous medium.

7. Apparatus according to claim 6, the scrubber comprising a housing and being disposed alongside the common housing of the gas shaft and the dust remover, said housings having a common housing wall.

8. Apparatus according to claim 6, said beds being laterally offset providing an upwardly decreasing flow area on the inlet side of the beds and an upwardly increasing cross-sectional flow area on the outlet side of the beds.

9. Apparatus for removal of sulfur compounds from flue gases which comprises:
  (a) a gas shaft having a plurality of catalyst beds disposed at vertically spaced intervals, and means separating the beds for parallel flow of flue gas through the beds,
  (b) means for spraying the top of each of the beds with an aqueous medium,
  (c) said catalyst beds being spaced from two opposite sides of said housing providing a first passageway between the beds and the housing for passage of gas to the catalyst beds and a second passageway between the beds and the housing for receiving gas from the beds; a gas outlet stack communicating with the upper end of said second passageway, a baffle interposed betwen each catalyst bed and the next lower catalyst bed joined to the end of the upper bed adjacent said first passageway and joined to the end of the lower bed adjacent said second passageway for conveying gas from the first passageway to the top of the lower bed and for receiving aqueous medium sprayed onto the upper bed and conveying the aqueous medium after issuance from the upper bed to adjacent said second passageway, whereby flow of gas and liquor through the beds is concurrent.

References Cited

UNITED STATES PATENTS

| 2,303,811 | 12/1942 | Badenhauser | 23—262 |
| 2,614,033 | 10/1952 | Cornell et al. | 23—288 |
| 3,008,807 | 11/1961 | Hilgert et al. | 23—260 |
| 3,318,662 | 5/1967 | Pauling | 23—168 |

FOREIGN PATENTS

| 574,472 | 1/1946 | Great Britain. |
| 793,864 | 4/1958 | Great Britain. |

JOSEPH SCOVRONEK, Primary Examiner

U.S. Cl. X.R.

23—2, 168, 175, 261, 283; 55—260, 324; 261—23, 98